(12) United States Patent
Harvey et al.

(10) Patent No.: US 6,450,063 B1
(45) Date of Patent: Sep. 17, 2002

(54) FOLDING HANDLE

(75) Inventors: John Harvey; Christodoulos Toulis, both of Wellington (NZ)

(73) Assignee: Interlock Group Limited (NZ)

( * ) Notice: Subject to any disclaimer, the term of this patent is extended or adjusted under 35 U.S.C. 154(b) by 0 days.

(21) Appl. No.: 09/561,610

(22) Filed: Apr. 27, 2000

(30) Foreign Application Priority Data

Apr. 29, 1999 (NZ) .................................. 335475

(51) Int. Cl.[7] .............................. G05G 1/00; G05G 5/06
(52) U.S. Cl. .......................... 74/547; 74/545; 74/527; 74/528; 251/99; 251/98; 16/429
(58) Field of Search .......................... 74/543, 545, 547, 74/528, 557, 529; 16/429; 49/341–345, 336, 337; 251/99, 98

(56) References Cited

U.S. PATENT DOCUMENTS

| 2,065,750 A | * 12/1936 | Safford | 74/547 |
|---|---|---|---|
| 2,452,742 A | * 11/1948 | Franzene | 74/548 |
| 4,615,236 A | * 10/1986 | Boots | 74/545 |
| 5,072,913 A | * 12/1991 | Carroll et al. | 251/99 |
| 5,168,770 A | 12/1992 | Ellis | 549/74 |
| 5,201,241 A | * 4/1993 | Pollack | 74/528 |
| 5,299,597 A | * 4/1994 | Fort et al. | 137/385 |
| 5,400,473 A | * 3/1995 | Delman | 16/115 |
| 5,560,082 A | 10/1996 | Vetter | 429/16 |
| 5,829,199 A | * 11/1998 | Harvey et al. | 49/325 |
| 5,887,850 A | * 3/1999 | Ruffalo | 251/95 |
| 6,164,156 A | * 12/2000 | Purcell | 74/547 |
| 6,325,355 B1 | * 12/2001 | Johnson | 251/99 |

FOREIGN PATENT DOCUMENTS

| GB | 2023983 A | * 1/1980 | 74/547 |
|---|---|---|---|
| JP | 10-280797 | * 10/1998 | |

* cited by examiner

Primary Examiner—Vinh T. Luong
(74) Attorney, Agent, or Firm—Blakely Sokoloff Taylor & Zafman

(57) ABSTRACT

A folding handle for attachment to a rotatable shaft element. The handle includes a handle body 10 having a cavity 17 within which a mounting block 20 is engaged. The mounting block 20 has oppositely projecting pivot members 21 slidingly engaged in recesses 19 in the walls 18 of the cavity 17. The pivot members 21 therefore engage with bearing surfaces 19a to facilitate pivotal movement of the handle body 10 relative to the mounting block 20. A clip 24 retains the mounting block 20 in cavity 17. No pivot pin is therefore visible.

9 Claims, 3 Drawing Sheets

FOLDING HANDLE

BACKGROUND OF THE INVENTION

1. Discussion of the Background

This invention relates to a handle and more particularly a handle which is useful in connection with the operation of a window operator.

While the present invention is particularly directed toward a handle which is intended for use with a window operator, the handle can have other applications where a handle is fitted to a rotatable shaft so as to facilitate operation of some mechanism, eg a fishing reel or any other rotatable mechanism.

2. Description of the Related Art

With a window operator, it is typical for the window operator to comprise a housing which incorporates a link adapted for connection to a window sash movably mounted within a window frame. Within the housing is a mechanism for operating the link. The mechanism is actuated via a shaft (the free end of which is usually splined) which projects from the housing. A handle is attachable to the splined shaft so as to facilitate rotation of the shaft.

Typically with known operators, the handle projects out from the housing and therefore can be intrusive when it is not required for actual operation of the operator. It is therefore known to provide a handle which can be moved from an in-use position to a stored position where it does not unnecessarily project from the housing. When stored in the "non-use" position, the handle is therefore not as intrusive as when in the "use" position.

Known handles of this type have suffered from drawbacks. For example, it is usual that the handle be pivotally (see U.S. Pat. No. specifications 5,560,082 of Vetter and U.S. Pat. No. 5,168,770 of Ellis) coupled to a mounting block by a pivot pin. This pin extends through the handle and the block and therefore is readily visible externally of the handle. As there is a greater move toward improving the aesthetic appearance of window hardware, especially that which is readily visible, the visual impact of the ends of the pivot pin can detract from the overall appearance of the handle and its associated operator.

Also, known handles have suffered from the drawback of comprising a number of elements which need to be assembled sometimes in very fiddly assembly operations.

SUMMARY OF THE INVENTION

It is therefore an object of the present invention to provide a foldable handle which does not suffer from some or all of the aforementioned disadvantages or at least provides the public with a useful choice.

Broadly, according to the present invention, there is provided a handle including a mounting block adapted for attachment to a rotatable shaft element, a handle body having a cavity within which the block is engaged, the mounting block including pivot members slidingly engaged in recesses in the cavity to engage with bearing journals to facilitate pivotal movement of the handle relative to the mounting block.

BRIEF DESCRIPTION OF THE DRAWINGS

In the following more detailed description of the invention reference will be made to the accompanying drawings in which.

DESCRIPTION OF THE PREFERRED EMBODIMENTS

In the present specification, reference will be made to the handle being movable or foldable between stored or "non-use" and "in-use" positions. This does not necessarily mean that the handle when in the stored position is incapable of being used to apply at least a part rotation of the shaft means to which the handle can be attached. Generally, however, in such a stored or non-use position it is impractical or difficult to apply a rotational movement in whole or in part to the shaft means.

Figure 1:
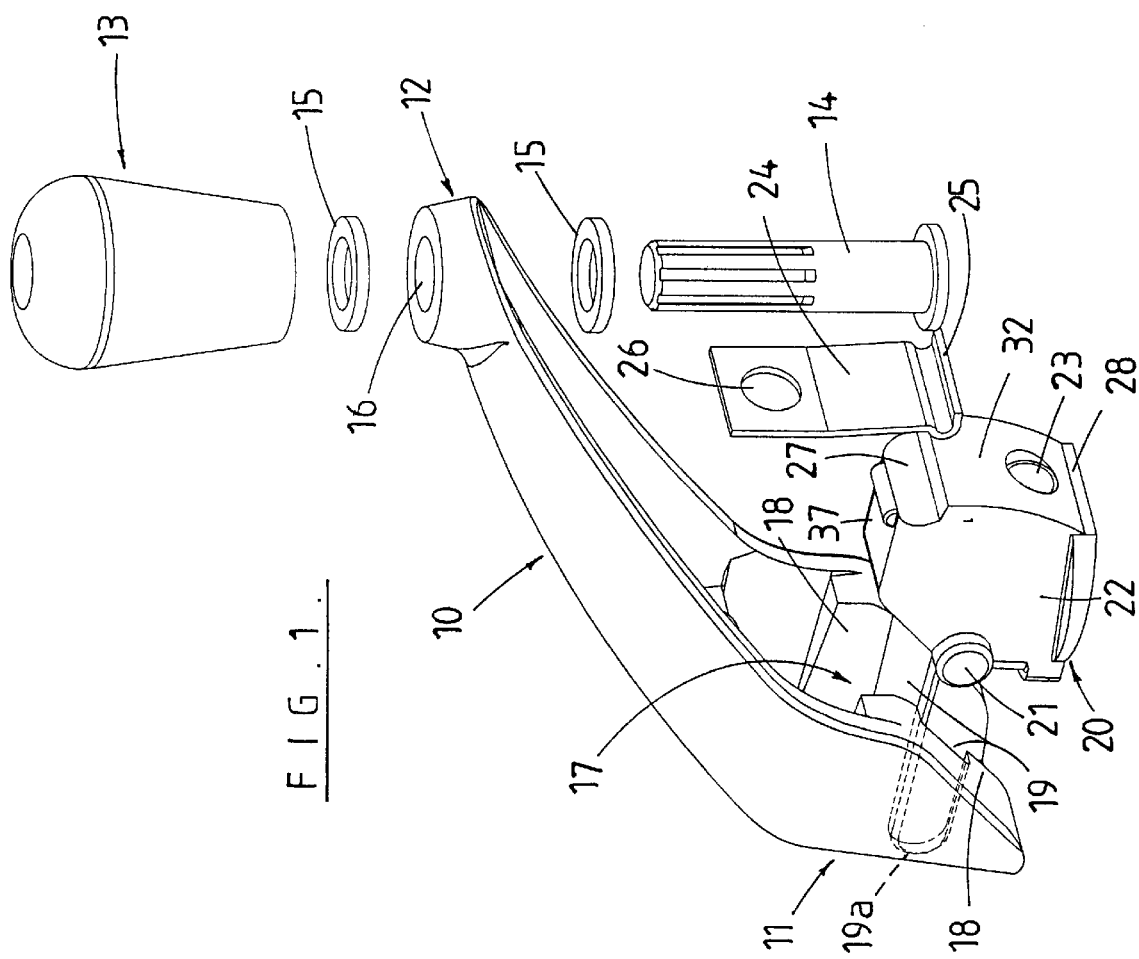
FIG. 1 is an exploded view of a preferred form of the handle.

Referring firstly to FIG. 1, the handle comprises a handle body 10 having a base end 11 and a distal end 12. A knob 13 is rotatably attached to the distal end 12 by, for example, a splined fastener 14 which extends through an opening 16 in the distal end 12 to engage with the knob 13 in a known manner. Washers 15 separate the head of the fastener 14 and the knob 13 from direct contact with surfaces of the distal end 12.

The base end 11 includes a recess or cavity 17. This cavity 17 includes a pair of opposed surfaces 18, each of which has an elongate recess or channel 19 extending into the cavity. The inner end of each channel/recess 19 is preferably formed with a curved end or bearing surface 19a, the reason for which will hereinafter become apparent.

The mounting block 20 includes a pair of oppositely projecting spigots 21. These spigots 21 are dimensioned so that they slidingly fit in a reasonably snug manner within respective of the elongate recesses 19. The curved peripheral surface of the spigot 21 is of a diameter which is slightly less than the distance between the opposing side walls of the channel/recess 19 and also the diameter of the curved end wall 19a of the recess 19.

The mounting block 20 is installed into the cavity 17 so that side walls 22 of block 20 locate opposite respective walls 18. To achieve installation the spigots 21 slide along recesses 19. The spigots 21 thus engage against or at least locate adjacent the curved end walls 19a of the recesses 19. The handle body 10 can thus be pivotally moved substantially about a central axis passing through the aligned but oppositely projecting spigots 21.

A bore 29 (preferably a blind bore) is formed in the mounting block 20 and has a central longitudinal axis at right angles to the aforementioned pivot axis passing through the spigots 21. In use, the splined shaft of a window operator is engaged within bore 29.

A second bore 23 is provided in mounting block 20 and is at mutual right angles to bore 29. A fastener can thus extend through bore 23 (which extends into bore 29) to engage with the splined shaft when in bore 29 so as to fix the mounting block 20 to the splined shaft of the window operator.

To retain the mounting block 20 in its operative position within the cavity 17, a clip 24 is provided. A contact surface 25 (in the form shown of arcuate cross-section) is formed toward one end of the clip 24 while toward the other end of the clip 24 is an opening 26. Preferably, the portion of the clip 24 in which opening 26 is located is at a slight angle to the remainder of the length of the clip 24 as can be seen, for example, in FIG. 1.

Figure 2:
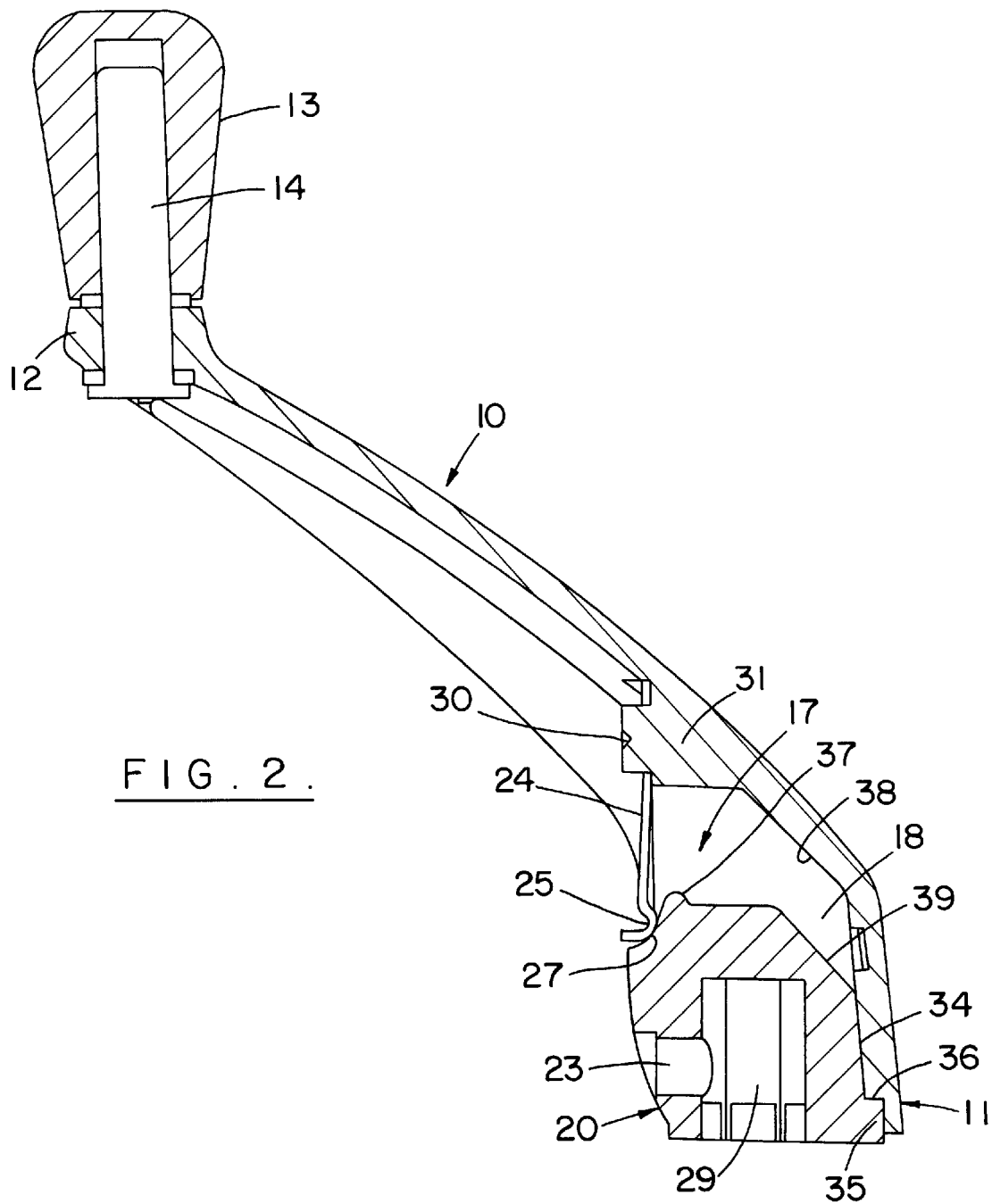
FIG. 2 is a sectioned side elevation view taken on the central longitudinal axis of symmetry of a slightly modified form of the handle shown in FIG. 1 with the handle in the "use" position.
Figure 3:
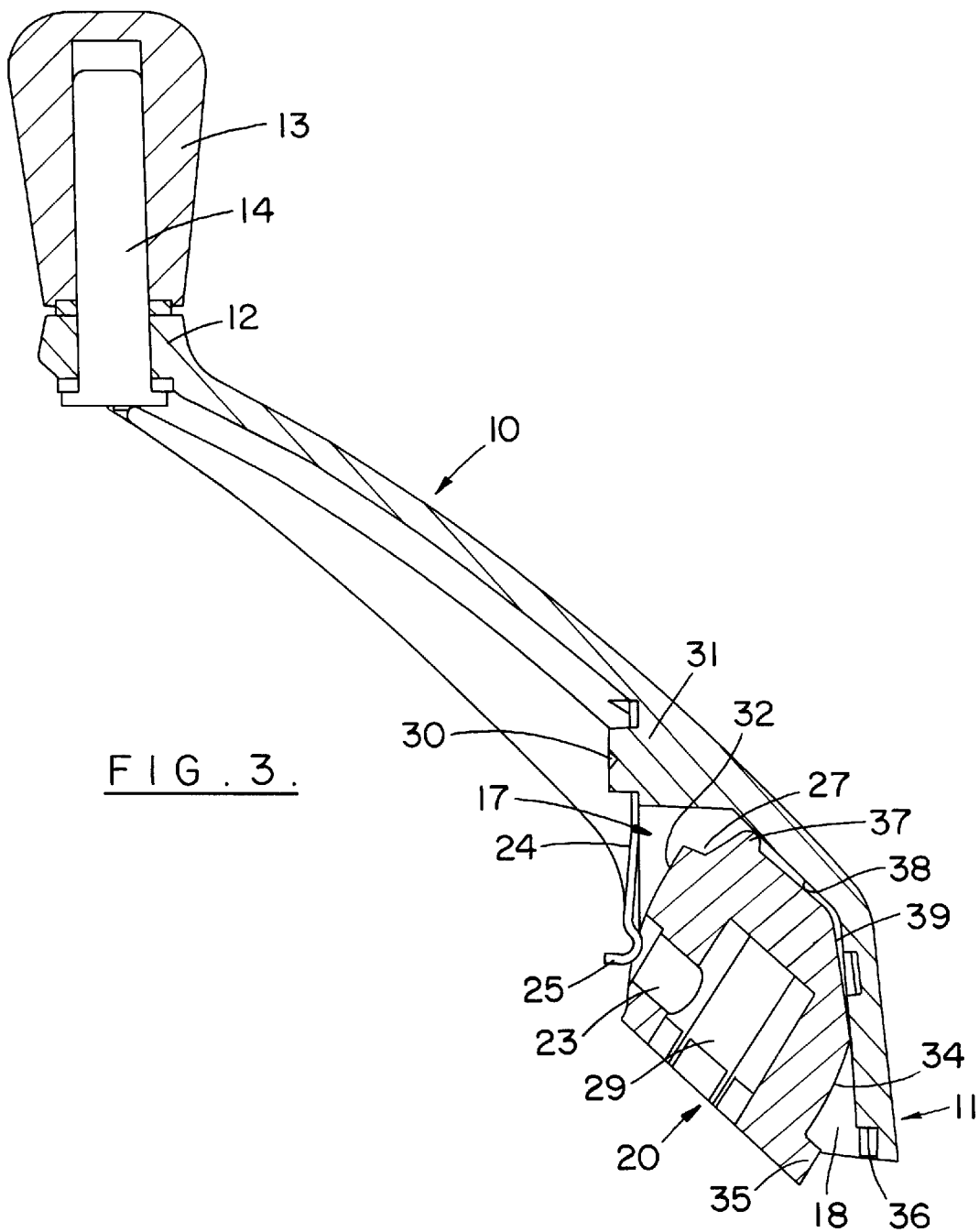
FIG. 3 is a view similar to FIG. 2 but with the handle folded to a stored or "non-use" position.

A projection 30 is formed in a portion 31 within the handle body 10 (see FIGS. 2 and 3). This projection 30 engages within opening 26 thereby locating the clip 24 within the handle body 10.

The contact surface 25 engages with the mounting block 20. It can engage in a detent 27 or a detent 28 depending on whether or not the handle is in the "in-use" or stored positions. The contact surface 25 rides over surface 32 of the mounting block 20 as the handle is moved between its two extreme positions. Thus, the engagement of the contact surface 25 in either of detents 27 and 28 ensures that the handle is held firmly at its "use" or "non-use" positions as the case may be.

In an alternative arrangement as shown in FIGS. 2 and 3, only detent 27 is provided. Thus the contact surface 25 engages in the detent 27 when the handle is in the "use" position. This ensures that the handle does not tend to pivot toward its stored position when it is being used. The need to hold the handle firmly in the stored position is, however, not as great therefore it is simply maintained in the "non-use" position by the effective spring pressure or friction resulting from the contact surface 25 making contact with surface 32.

The side of the mounting block 20 opposite to that having surface 32 is provided with a flat surface 34 and an inclined surface 29 leading to top surface 37. A lip 35 extends outwardly from surface 34. When the handle is in the "in-use" position, lip 35 locates within rebate 36 thereby further locating the handle body 10 with the mounting block so that the handle does not tend to move relative to the mounting block as a winding operation is carried out via rotation of the knob 13.

The inclined surface 39 provides a clearance enabling the handle body 10 to pivot relative to the mounting block 20. When the handle has been moved to its stored or "non-use" position, the top surface 37 engages with flat internal surface 38 of the handle body 10. The rebate 36 and the surface 28 therefore provide end stops to limit the extent of movement of the handle body 10 relative to the mounting block 20.

The handle according to the present invention thus provides a construction whereby a separate pivot pin is not required. Therefore, there is no need for opposing bores to be drilled or otherwise formed through the mounting end 11 of the handle body 10 for the passage of a pivot pin nor indeed the ends of the pivot pin being externally visible. The pivot arrangement is totally located within the cavity 17 and therefore is not readily visible, hence improving the aesthetic appeal of the handle.

The use of the clip 24 to not only retain the mounting block 20 in its operative position within the cavity 17 but also to provide at least one detent results in a minimum of componentry and very simple assembly procedures.

What is claimed is:

1. A handle including:

a handle body;

a cavity in the handle body;

a mounting block located in said cavity;

pivot members projecting from said mounting block;

bearing journals within said cavity and with each of which is pivotally located a pivot member;

a retention member which retains the mounting block in the cavity so that the pivot members remain pivotally engaged with said journal bearings to facilitate pivotal movement of the handle between first and second positions relative to the mounting block; and open-ended channels in the cavity through which said pivot members slide to locate the mounting block in the cavity.

2. A handle as claimed in claim 1 wherein the mounting block includes a first bore to receive the end of a shaft and a second bore intersecting with the first bore, the second bore being able to receive a fastening for fastening the mounting block to the shaft when located in the first bore.

3. A handle as claimed claim 1 wherein the pivot members comprise a pair of oppositely projecting spigots.

4. A handle as claimed in claim 1 wherein the cavity includes opposing side walls, a said open ended channel is formed in each side wall and, each channel communicates with a bearing journal surface.

5. A handle as claimed in claim 4 further including a contact surface engaged with the mounting block to define the first and/or second positions.

6. A handle as claimed in claim 4 further including a resistance mechanism to resist movement of the handle relative to the mounting block when the handle is at one or both of the first and second positions.

7. A handle as claimed in claim 1 wherein the retention member provides a detent action.

8. A handle as claimed in claim 7 wherein the retention member is a cantilevered clip with a distal end which is profiled to engage in at least one detent in the mounting block.

9. A handle as claimed in claim 8 wherein the mounting block has a pair of spaced apart detents.

\* \* \* \* \*